United States Patent
Ringhouse et al.

(10) Patent No.: US 8,080,275 B2
(45) Date of Patent: Dec. 20, 2011

(54) COMPOSITION FOR REDUCING FAT MIGRATION IN FOOD PRODUCTS

(75) Inventors: Todd Allen Ringhouse, Plymouth, MN (US); Ann Elizabeth Sinclair, Minneapolis, MN (US)

(73) Assignee: Vision Processing Technologies, Inc., Litchfield, MN (US)

( * ) Notice: Subject to any disclaimer, the term of this patent is extended or adjusted under 35 U.S.C. 154(b) by 776 days.

(21) Appl. No.: 12/067,929

(22) PCT Filed: Sep. 25, 2006

(86) PCT No.: PCT/US2006/037311
§ 371 (c)(1),
(2), (4) Date: Aug. 21, 2008

(87) PCT Pub. No.: WO2007/035933
PCT Pub. Date: Mar. 29, 2007

(65) Prior Publication Data
US 2008/0311273 A1 Dec. 18, 2008

Related U.S. Application Data

(60) Provisional application No. 60/720,075, filed on Sep. 23, 2005.

(51) Int. Cl.
*A23L 1/20* (2006.01)

(52) U.S. Cl. .......... 426/633; 426/601; 426/607
(58) Field of Classification Search .......... 426/633, 426/601, 607
See application file for complete search history.

(56) References Cited

U.S. PATENT DOCUMENTS

| | | | |
|---|---|---|---|
| 3,006,770 A | | 10/1961 | Wiedermann |
| 3,266,905 A | | 8/1966 | Baker et al. |
| 3,671,267 A | * | 6/1972 | Gooding ............... 426/633 |
| 3,766,226 A | * | 10/1973 | Gooding ............... 554/145 |
| 4,842,648 A | | 6/1989 | Phadoemchit et al. |
| 5,962,064 A | | 10/1999 | Perlman |
| 6,020,003 A | | 2/2000 | Stroh et al. |
| 2004/0096567 A1 | | 5/2004 | Thaler et al. |
| 2005/0276900 A1 | | 12/2005 | Ullanoormadam |

OTHER PUBLICATIONS

International Search Report for PCT/US2006/037311; Date of Mailing: Mar. 27, 2007; 6 pages.
Written Opinion of the International Searching Authority for PCT/US2006/037311; Date of Mailing: Mar. 27, 2007; 7 pages.

* cited by examiner

*Primary Examiner* — Helen F Heggestad
(74) *Attorney, Agent, or Firm* — Briggs and Morgan, P.A.; Aleya R. Champlin; Audrey J. Babcock

(57) ABSTRACT

A composition for reducing or substantially eliminating oil or fat separation in a food product is described. The composition includes a source of saturated fat and a recrystallization agent. A method of making this composition, and of using this composition in a food product, is also described.

11 Claims, No Drawings

COMPOSITION FOR REDUCING FAT MIGRATION IN FOOD PRODUCTS

RELATED APPLICATIONS

This application is a national stage filing of PCT/US2006/037311, filed Sep. 25, 2006, which claims the benefit of the filing date and contents of U.S. Provisional Application No. 60/720,075, filed on Sep. 23, 2005.

FIELD OF THE INVENTION

The present invention relates to a composition which reduces or substantially eliminates oil or fat separation in a food product. Specifically, the present invention relates to a composition which includes a source of saturated fat and a recrystallization agent, such as an edible wax. The present invention also relates to a method of making this composition, and of using this composition in a food product.

BACKGROUND

In the commercial food industry, hydrogenated oil and/or mono-diglycerides are added to fat-containing food products to stabilize the fat to avoid fat separation from the other components of the food product. However, in the organic and natural food industries, hydrogenated fats are not acceptable. As a result, fat separation in organic or natural food products is quite prevalent. As consumers become more aware of potential health problems associated with hydrogenated and partially hydrogenated fats, and the transesterification of the fatty acid chains that occurs upon hydrogenation (resulting in commonly known "trans-fats"), mainstream commercial food manufacturers will continue to attempt to limit or even eliminate the amount of hydrogenated fats and oils used in food products.

Typically, natural or organic food products containing oil, such as peanut or other nut butters, begin to show oil separation soon after the food product is made. It is quite common for consumers to see a layer of oil that has separated out from the product while the product is on the retail shelf. Not only does the separated layer of oil make the product less appealing, it also makes the product more difficult to use because the texture of the product changes as the oil migrates. The textural changes cannot be overcome simply by mixing by hand, since the product beneath the separated oil layer has become quite solid. The difficulty in using the product is exacerbated by the fact that often, natural or organic food products contain little or no added preservatives, and therefore must be refrigerated once opened to retain freshness. Refrigerating intensifies the problem because the already solidified product becomes even more difficult for the consumer to use at cooler temperatures.

U.S. Patent Application Publication Number 2004/0096567 describes an organic peanut butter formulation. This formulation includes palm stearin as a stabilizing agent, in order to reduce the separation of oil from the peanut butter.

SUMMARY OF THE INVENTION

The present invention is directed to a composition for a food product, wherein the composition is capable of reducing or substantially eliminating the oil separation in the food product. The composition comprises a source of saturated fat and a recrystallization agent. The recrystallization agent may be present in the composition in an amount ranging from about 0.5 wt-% to about 30 wt-% of the weight of the saturated fat. In one embodiment, the source of saturated fat is palm stearin, and the recrystallization agent is an edible wax, such as carnuba wax.

The present invention is further directed to a food product containing a composition which comprises a source of saturated fat and a recrystallization agent. In one embodiment, this food product is a butter or spread, such as peanut butter. Oil separation in the food product is reduced by the composition, without the use of added hydrogenated fats or oils.

The present invention is also directed to a method of manufacturing a blended powder comprising a saturated fat and a recrystallization agent. Another aspect of the present invention includes a method of making a food product comprising a saturated fat and a recrystallization agent.

DETAILED DESCRIPTION

The present invention is directed to the surprising discovery that the use of a source of saturated fat in combination with a recrystallization agent, such as an edible wax, reduces or substantially eliminates oil or fat separation in the food product. It was surprisingly found that by adding a source of saturated fat and a recrystallization agent to a product, oil separation was significantly reduced or substantially eliminated for an extended period of time, making the product more appealing to and useable by consumers.

As used herein, the terms "butter" or "nut butter" shall be defined to include spreadable food products made from grinding or similarly processing nuts, legumes, seeds, fruits and the like.

Saturated fats are triglycerides formed from esters of glycerol and saturated fatty acids. Saturated fatty acids are fatty acids which have no double bonds between the carbon atoms. Examples of saturated fatty acids include, but are not limited to, lauric acid, myristic acid, palmitic acid, and stearic acid.

As used herein, the term "highly saturated fat" is defined as any source of saturated fat, wherein the level of saturated fat is sufficient to enable the composition to reduce or prevent oil separation in a product at room temperature. Any food grade saturated fat, such as vegetable, animal, or petroleum-based fat, may be used in accordance with the present invention. Examples of highly saturated fats which may be used in accordance with the present invention include, but are not limited to, lard, tallow, butter, cocoa butter, and palm stearin. The preferred highly saturated fat is palm stearin.

As used herein, the term "added highly saturated fat" includes any source of highly saturated fat that is added to a food product. The amount of highly saturated fat added to the food product will vary depending on the food product. If the food product is a nut butter, the amount of highly saturated fat added to the nut butter will partly depend on the type of nut used and the fineness of its grind. Useful amounts range from about 0.5% by weight (hereinafter, "wt-%") up to about 30 wt-%, with the percentages given as a percent of the total final product weight. Preferably, the highly saturated fat is added in an amount ranging from about 0.5 wt-% to about 10 wt-% of the total final product weight. More preferably, the highly saturated fat is added in an amount ranging from about 3.0 wt-% to about 5.0 wt-% of the total final product weight.

As used herein, a "recrystallization agent" is any food grade ingredient that can be combined with the highly saturated fat to facilitate recrystallization of the fat phase of a food product, thereby reducing or substantially eliminating fat or oil separation in the food product. The recrystallization agent includes, but is not limited to, a food-grade edible wax, or a mono-diglyceride. "Mono-diglyceride" is a term commonly used to describe a mixture of monoglycerides and diglycerides. A mono-diglyceride is typically defined as an ester formed when an acid combines with an alcohol. Specifically, a mono-diglyceride is an ester which is formed when the fatty acid is a triglyceride fat which combines with a polyvalent alcohol such as glycerol. When one fatty acid molecule combines with one glycerol molecule, a monoglyceride is formed. When two fatty acid molecules combine with one glycerol molecule, a diglyceride is formed.

Any food grade wax can be used in accordance with the present invention, such as food grade vegetable, animal, petroleum, or shellac-based wax. Examples of suitable waxes include, but are not limited to, beeswax, paraffin, and carnuba wax. The preferred wax is carnuba wax. The amount of wax added to the food product will depend on the food product, and on the amount of highly saturated fat added to the food product. If the food product is a nut butter, the amount of wax added to the nut butter will partly depend on the type of nut used and the fineness of its grind. Useful amounts of wax range from about 0.5 wt-% to about 10 wt-% of the added highly saturated fat weight. Preferably, the wax is added in an amount ranging from about 1.5 wt-% to about 5 wt-% of the added highly saturated fat weight. More preferably, the wax is added in an amount ranging from about 2 wt-% to about 3 wt-% of the added highly saturated fat weight.

Trans-fat free mono-diglycerides are permitted for use in the natural foods industry. In the present invention, a recrystallization agent comprising trans-fat free mono-diglycerides may be added to the highly saturated fat in order to improve material handling characteristics and to promote recrystallization of the oils to reduce oil separation in the food product. An example of a mono-diglyceride that may be used is Alphadim 2 HS, supplied by American Ingredients Company, Kansas City, Mo. The amount of mono-diglycerides added to the food product will depend on the food product, and on the amount of highly saturated fat added to the food product. If the food product is a nut butter, the amount of mono-diglycerides added to the nut butter will partly depend on the type of nut used and the fineness of its grind. Useful amounts of mono-diglycerides range from about 10 wt-% to about 30 wt-% of the added highly saturated fat weight. Preferably, the mono-diglycerides are added in an amount ranging from about 15 wt-% to about 25 wt-% of the added highly saturated fat weight.

The highly saturated fat and the recrystallization agent may be mixed into the food product during a milling process or a homogenizing process. The highly saturated fat and recrystallization agent may also be pre-blended into an ingredient to be later added during the milling or homogenizing process. The highly saturated fat and recrystallization agent may be added to the food product in any form, such as liquid, solid, or powdered, and may be added as separate ingredients or as a blended ingredient. When added to a food product during processing, the highly saturated fat and recrystallization agent are typically easier to handle in powdered form than in solid form. Preferably, the highly saturated fat and recrystallization agent are added as a powdered ingredient during food processing. More preferably, the highly saturated fat and recrystallization agent are added as a pre-blended, powdered ingredient.

In another embodiment of the present invention, a recrystallization agent may be added directly to a food containing a highly saturated fat.

One embodiment of a blended, powdered ingredient in accordance with the present invention may be made by using palm stearin and carnuba wax. To make this ingredient, solid palm stearin and carnuba wax may be melted at a temperature of approximately 150° F., then atomized into a cold chamber via two-fluid or pressure nozzles. The cold chamber may be cooled to a temperature sufficient to harden the blended ingredient. Preferably, this temperature is below room temperature (generally defined as between about 68° F. to 77° F.) In one embodiment, the blended ingredient was cooled to about 60° F. The cold chamber may be cooled by various means, such as by using a glycol chilling system or an ammonia cooler. Alternatively, liquid nitrogen may be pumped into the cooling tank. A free flow agent, such as silicone dioxide, may be added to the palm stearin and carnuba wax, in order to avoid clumping. The resultant powder may then be collected from the main chamber and packaged. If a baghouse is used in conjunction with the cold chamber, the resultant powder may be collected from the baghouse and packaged.

A blended ingredient comprising palm stearin and mono-diglycerides may also be made in the same manner. However, a temperature higher than 150° F. may be required to melt the mono-diglycerides.

Temperatures useful for making the blended ingredient of the present invention can range from about 150° F. to about 170° F., although those skilled in the art will appreciate that the temperatures may vary beyond the recited range depending on the processing conditions and the types of starting materials used.

A blended, powdered ingredient comprising a highly saturated fat and a recrystallization agent in accordance with the present invention may also be prepared by using any conventional process for preparing powdered shortenings or similar ingredients, such as, but not limited to, a spray drying process.

When a powder including a highly saturated fat and a recrystallization agent is added to a food product, the powder may melt during food processing due to the increase in temperature of many food processing systems, such as by heating, mixing, extruding, and the like. Upon subsequent cooling, recrystallization of the entire fat phase may then occur, resulting in a product having a uniform consistency with little oil separation. While not intending to be bound by theory, it is believed that the combination of the highly saturated fat and the recrystallization agent promotes recrystallization of the fat phase, thereby entrapping the oil in the food product and reducing its separation from the other components of the food product. Recrystallization is more likely if the food product is quickly packed and cooled One embodiment of a food product made in accordance with the present invention may be made by grinding or similarly processing a nut ingredient until the nut ingredient is in a butter form. The resultant ingredient in a butter form is a nut butter. The nut ingredient may include nuts, legumes, seeds, fruits and the like. A highly saturated fat and a recrystallization agent are added to the nut butter. The highly saturated fat and the recrystaliziation agent may be added to the nut butter at different times, or they may be added to the nut butter simultaneously. If added to the nut butter simultaneously, the highly saturated fat and the recrystallization agent may be added together as one blended ingredient. The highly saturated fat and the recrystallization agent may be added in any form, such as a liquid, a solid, or a powder. The highly saturated fat and the recrystallization agent may be melted before they are added to the nut butter. If palm stearin is used as the highly saturated fat, and carnuba wax is used as the recrystallization agent, the highly saturated fat and recrystallization agent may be melted at a temperature of approximately 150° F. However, if mono-diglycerides are used as the recrystallization agent, a higher melting temperature may be required.

After their addition to the nut butter, the highly saturated fat and the recrystallization agent are mixed into the nut butter to create a mixture. In order to facilitate mixing, it may be necessary to heat the mixture. If the highly saturated fat and the recrystallization agent had been heated before they were mixed into the nut butter, or if the mixture itself required or became heated during the mixing process, the mixture may then be cooled. Rapid cooling may be required in order to promote recrystallization of the fat phase. The appropriate cooling temperature, and the appropriate amount of time at which to maintain the mixture at the cooling temperature, will vary according to the manufacturing process used to make the food product. In one embodiment, the cooling temperature was about 60° F.

The present invention can be used with any food product in which oil or fat migration is an issue. Examples of such food products include, but are not limited to: peanut butter, other nut butters such as sunflower seed butter, hazelnut butter, walnut butter, soy nut butter, pecan butter, almond butter, cashew butter, and the like; spreads; chocolate and other cacao seed-containing products; bar products; and the like.

Example I

Palm stearin and carnuba wax were added to peanut butter according to the formula of Table 1, resulting in 16.0 oz of the resulting product. The peanut butter was made of ground peanuts. After the addition of palm stearin and carnuba wax, the resulting product had a creamy texture and good mouthfeel. Oil separation was significantly reduced or substantially eliminated for an extended period of time. Due to the significant reduction or substantial elimination of oil separation, the product would be able to be stocked on a store shelf without refrigeration.

TABLE 1

| Ingredient | Weight |
| --- | --- |
| Peanut Butter[1] | 15.2 oz |
| Palm Stearin[2] | 0.8 oz (5.0% of the total weight) |
| Carnuba Wax[3] | 0.004 oz (0.5% of the palm stearin weight) |

[1]East Wind Natural Peanut Butter, Smooth, No Salt, East Wind Nutbutters, Tecumseh, MO
[2]PALMFRUIT ™ Stearin, Ciranda, Inc., Hudson, WI
[3]Food grade carnuba wax, Gehring-Montgomery, Inc., Warminster, PA

Example II

Palm stearin and carnuba wax were added to peanut butter according to the formula of Table 2, resulting in 16.0 oz of the resulting product. The peanut butter was made of ground peanuts. After the addition of palm stearin and carnuba wax, the resulting product had a creamy texture and good mouthfeel. Oil separation was significantly reduced or substantially eliminated for an extended period of time. Due to the significant reduction or substantial elimination of oil separation, the product would be able to be stocked on a store shelf without refrigeration.

TABLE 2

| Ingredient | Weight |
| --- | --- |
| Peanut Butter[1] | 15.4 oz |
| Palm Stearin[2] | 0.64 oz (4.0% of the total weight) |
| Carnuba Wax[3] | 0.0096 oz (1.5% of the palm stearin weight) |

[1]East Wind Natural Peanut Butter, Smooth, No Salt, East Wind Nutbutters, Tecumseh, MO
[2]PALMFRUIT ™ Stearin, Ciranda, Inc., Hudson, WI
[3]Food grade carnuba wax, Gehring-Montgomery, Inc., Warminster, PA

Example III

Blended ingredients comprising palm stearin and carnuba wax were prepared. Various amounts of these blended ingredients were mixed with peanut butter. The resulting samples of peanut butter containing blended ingredients were analyzed for product stability. These peanut butters were compared to a sample of a control peanut butter, which contained no added stabilizing agents, and to peanut butter samples which each contained one of the following stabilizing agents: NU-BAKE® rice formula, pure palm stearin, and lecithin (syrup). The compositions of the stabilizing agents, and the amount of stabilizing agents contained in each sample, are listed in Table 3.

TABLE 3

| Sample No. | Stabilizing Agent | Percentage of Stabilizing Agent in Sample (as a percentage of total sample weight) |
| --- | --- | --- |
| 1 | No stabilizing agent added (control sample) | N/A |
| 2 | 0.5 wt-% carnuba wax[1]; 99.5 wt-% palm stearin[2] | 3 wt-% |
| 3 | 1.0 wt-% carnuba wax[1]; 99 wt-% palm stearin[2] | 3 wt-% |
| 4 | 0.5 wt-% carnuba wax[1]; 99.5 wt-% palm stearin[2] | 4 wt-% |
| 5 | 1.0 wt-% carnuba wax[1]; 99 wt-% palm stearin[2] | 4 wt-% |
| 6 | NU-BAKE ® rice formula[3] | 10 wt-% |
| 7 | Pure palm stearin[2] | 5 wt-% |
| 8 | Lecithin (syrup)[4] | 2 wt-% |

[1]Food grade carnuba wax, Gehring-Montgomery, Inc., Warminster, PA
[2]PALMFRUIT ™ Stearin, Ciranda, Inc., Hudson, WI
[3]NU-BAKE ®, RIBUS, Inc., St. Louis, MO
[4]Organic Soy Lecithin, Clarkson Soy Products, LLC, Cerro Gordo, IL The peanut butter used to prepare all of the samples was East Wind Natural Peanut Butter, Smooth, No Salt (East Wind Nutbutters, Tecumseh, Mo.). The peanut butter had no added ingredients, prior to the addition of the stabilizing agents. The weight of each sample, after the stabilizing agents were added, was 16 oz.

The blended ingredients comprised of palm stearin and carnuba wax were melted together at approximately 160° F., and then hand mixed into the peanut butter. When palm stearin alone was added, the palm stearin was also melted and then hand mixed into the peanut butter. The NU-BAKE® rice formula and lecithin were mixed into the peanut butter at room temperature. All samples were then cooled to approximately 60° F.

The percentage of oil in peanuts varies, Therefore, it would not be effective to weigh oil discharge from the peanut butter samples, because there is no normal amount of oil discharge against which the peanut butter samples could be compared. Therefore, the analysis of the samples was based on visual observation. A sample was considered to be "broken," or to have reached its "break point," when the oil had separated from the sample beyond a reasonable amount, such that the separation had an impact on handling and taste.

Sample 1, the control sample, was already broken when purchased. Samples 2-8 were prepared on day 1, by the addition of stabilizing agents. All samples were monitored at intervals of approximately two weeks, over the course of 143 days. The results of the observations of the samples are recorded in Table 4.

TABLE 4

| Day | Observations Regarding Oil Separation |
|---|---|
| 1 | Sample 1 already broken. |
| 11 | No visual oil separation for Samples 2-8. |
| 26 | Sample 6 starting to glisten. No visual oil separation for Samples 2-5, 7, and 8. |
| 39 | Sample 6 broken; ⅛ inch of oil appears on surface. Sample 8 starting to weep. No visual oil separation for Samples 2-5, and 7. |
| 53 | Sample 8 broken. Sample 7 starting to glisten. No visual oil separation for Samples 2-5. |
| 68 | Sample 7 glistening. No visual oil separation for Samples 2-5. |
| 81 | Sample 7 glistening; more oil apparent on surface. Sample 2 starting to glisten. No visual oil separation for Samples 3-5. |
| 94 | Sample 7 glistening; approximately ⅛ inch of oil on surface; appears broken. Sample 2 showing more oil on surface. Sample 4 starting to glisten. No visual oil separation for Samples 3 and 5. |
| 108 | Sample 7 broken. Sample 2 broken. Sample 4 glistening but not broken. No visual oil separation for Samples 3 and 5. |
| 123 | Sample 4 glistening. Samples 3 and 5 starting to glisten. |
| 143 | All samples either broken or glistening. Samples 2, 3, 4, and 5 are more stable than the other samples. |

The data show that samples containing a blended ingredient of palm stearin and carnuba wax exhibited stability, i.e., substantially no oil separation, as compared to control formulas that did not contain the blended ingredient.

The data also show that palm stearin, when used alone as an additive to peanut butter, will retard oil separation. However, it will not substantially eliminate oil separation, particularly when the food product is a peanut butter made from finely ground peanuts. Palm stearin alone also fails to substantially eliminate oil separation in other higher triglyceride nut butters, such as nut butters made from almonds or sunflower seeds.

The efficacy of any stabilizing agent added to nut butters may be affected by a number of variables, including the temperature at which the stabilizing agent is added to the nut butter, the temperature at which the nut butter is stored, the amount of time that the nut butter is maintained without refrigeration after the stabilizing agent is added, and the method of adding the stabilizing agent to the nut butter. Because these variables may differ for each nut butter manufacturing process, those skilled in the art will understand that variations of and modifications to different manufacturing processes may be required in order to attain the best results.

Example IV

A six-person panel tested and compared the following samples: peanut butters with both palm stearin and carnuba wax added; peanut butter with only palm stearin added; and a natural peanut butter with no stabilizing agents added. The compositions of the samples tested by the panel are given in Table 5. For Samples 1 and 4, the stabilizing agent was added to the peanut butter 39 days before the testing was conducted. For Samples 2 and 3, the stabilizing agent was added to the peanut butter 22 days before the testing was conducted.

TABLE 5

| Sample Number | Stabilizing Agent | Percentage of Stabilizing Agent in Sample (as a percentage of total sample weight) | Physical Appearance |
|---|---|---|---|
| Control[1] | No stabilizing agent added | N/A | Oil separation |
| Sample 1 | Palm stearin[2] | 5 wt-% | Slight oil separation |
| Sample 2 | 1 wt-% carnuba wax[3]; 99 wt-% palm stearin[2] | 4 wt-% | Slight oil separation |
| Sample 3 | 0.5 wt-% carnuba wax[3]; 99.5 wt-% palm stearin[2] | 4 wt-% | Slight oil separation |
| Sample 4 | 2 wt-% carnuba wax[3]; 98 wt-% palm stearin[2] | 5 wt-% | No oil separation |

[1]East Wind Natural Peanut Butter, Smooth, No Salt, East Wind Nutbutters, Tecumseh, MO
[2]PALMFRUIT ™ Stearin, Ciranda, Inc., Hudson, WI
[3]Food grade carnuba wax, Gehring-Montgomery, Inc., Warminster, PA The panelists rated the physical/visual appearance, taste, and mouthfeel of each sample. Each of these characteristics of the samples were rated on a scale of 1 to 5, with a "1" indicating that the panelists disliked the rated characteristic, and a "5" indicating that the panelists liked the rated characteristic. Tables 6, 7, and 8 present the panelists' ratings of the appearance, taste, and mouthfeel of the samples, respectively. The data in these tables include the averages of the ratings assigned to each characteristic, as well as comments from the panelists. Table 9 presents the average ratings of the appearance, taste, and mouthfeel of each sample, along with the average of those three scores for each sample.

TABLE 6

Panelist Ratings of Appearance of Samples

| Sample | Average Score | Comments |
|---|---|---|
| Control | 5.00 | Smooth and creamy; creamy |
| Sample 1 | 4.16 | Same as control; looks good and creamy; looks creamy |
| Sample 2 | 4.00 | Looks kind of grainy; creamy; better than control |
| Sample 3 | 4.50 | Creamy; looks like name brand product; looks good; similar to control; same as others |
| Sample 4 | 3.83 | Similar to control; runny; better than control; same as others; good |

TABLE 7

Panelist Ratings of Taste of Samples

| Sample | Average Score | Comments |
|---|---|---|
| Control | 4.00 | Tastes dull; tastes like natural peanut butter; muted; this has less taste than regular peanut butter |
| Sample 1 | 2.83 | Flavor similar to control; dull, not real nutty; a little flat; similar to control; not a consistent peanut butter taste; flavor seems muted; control was better; this had less peanut taste (than control) |
| Sample 2 | 3.83 | Taste is disappointing; I like the taste; more flavor than #1; taste better than #1; similar to control |

TABLE 7-continued

Panelist Ratings of Taste of Samples

| Sample | Average Score | Comments |
|---|---|---|
| Sample 3 | 3.34 | Off after taste; enhance the flavor; sugar needs to be added; I think #2 has better flavor; at first similar flavor to control (or slightly sweeter), but lost flavor very quickly; bland; not much taste; a tad muted |
| Sample 4 | 2.67 | Initial peanut flavor good; sugar needs to be added; flavor needs to be enhanced; missing something, not sure what; same as sample 3 (lost flavor quickly); not much flavor; bland aftertaste; not bad |

TABLE 8

Panelist Ratings of Mouthfeel of Samples

| Sample | Average Score | Comments |
|---|---|---|
| Control | 4.50 | Creamy; smooth and creamy |
| Sample 1 | 3.34 | Very sticky mouthfeel; compares well with control; good, smooth; good; about the same as control, maybe slightly "thinner" |
| Sample 2 | 3.50 | Creamy; creamy but sticks to mouthtop; doesn't feel as creamy; similar to control; a little dry; ok |
| Sample 3 | 3.00 | Texture and mouthfeel similar to name brands; different but fair; thinner than control; smooth and creamy; sticky |
| Sample 4 | 3.00 | Sticky; similar to name brands, not too oily; creamy; not impressed; real grainy; feels like there is something added, like an oil or lardy substance; smooth and creamy; sticky |

TABLE 9

Summary of Numerical Ratings

| Sample | Appearance | Taste | Mouthfeel | Average Score |
|---|---|---|---|---|
| Control | 5.00 | 4.00 | 4.50 | 4.50 |
| Sample 1 | 4.16 | 2.83 | 3.34 | 3.44 |
| Sample 2 | 4.00 | 3.83 | 3.50 | 3.78 |
| Sample 3 | 4.50 | 3.34 | 3.00 | 3.61 |
| Sample 4 | 3.83 | 2.67 | 3.00 | 3.17 |

The appearance of the samples, with the exception of the changes in appearance caused by oil separation, is largely dependent on the method of manufacturing the peanut butter and on the equipment used to manufacture the peanut butter, rather than on the stabilizing agents used. Moreover, the extent of the oil separation will depend in part on the fineness of the grind, which will vary for different manufacturers.

The panelists rated the control sample as having the best taste. Interestingly, Sample 1, which contained palm stearin alone as a stabilizing agent, was rated second lowest in taste. The addition of palm stearin alone as an stabilizing agent in peanut butter is considered to be the current norm of the organic and natural peanut butter industries.

The panelists rated Sample 4 the lowest with regard to mouthfeel. This was primarily due to its significant waxy mouthfeel, and to the suppression of taste buds on the tongue due to the waxy residue of the formula. A melting delay on the tongue may also have contributed to the low rating of Sample 4.

When viewing the results of the panelist testing overall, it appears that taste and mouthfeel are being compromised by the addition of palm stearin-based stabilizing agents. However, it may be possible to make adjustments, primarily in the blending of the nut butter with the stabilizing agents, to reduce the amount of stabilizing agents required per unit of nut butter. It may also be possible to disperse the stabilizing agents more thoroughly in the nut butter, to create a more homogeneous nut butter/stabilizing agent blend.

Although the foregoing Examples and Description fully disclose and enable the invention described herein, they are not intended to limit the scope of the present invention, which is defined by the following claims.

What is claimed is:

1. A nut butter comprising an added source of saturated fat and a recrystallization agent, wherein the source of saturated fat is a highly saturated non-hydrogenated palm stearin.

2. The nut butter of claim 1, wherein the recrystallization agent is selected from the group consisting of wax and mono-diglycerides.

3. The nut butter of claim 2, wherein the wax is selected from the group consisting of carnuba wax, beeswax, and paraffin.

4. The nut butter of claim 1, wherein the nut butter further comprises an ingredient selected from the group consisting of peanuts, sunflower seeds, hazelnuts, walnuts, soy nuts, pecans, almonds, and cashews.

5. The nut butter of claim 1, wherein the palm stearin is present in the nut butter in an amount ranging from about 0.5 wt-% to about 30 wt-%.

6. The nut butter of claim 1, wherein the palm stearin is present in the nut butter in an amount ranging from about 0.5 wt-% to about 10 wt-%.

7. The nut butter of claim 1, wherein the palm stearin is present in the nut butter in an amount ranging from about 3.0 wt-% to about 5.0 wt-%.

8. The nut butter of claim 5, wherein the recrystallization agent is present in the nut butter in an amount ranging from about 0.5 wt-% to about 30 wt-% of the weight of the palm stearin.

9. The nut butter of claim 5, wherein the recrystallization agent is present in the nut butter in an amount ranging from about 1.5 wt-% to about 5 wt-% of the weight of the palm stearin.

10. The nut butter of claim 5, wherein the recrystallization agent is present in the nut butter in an amount ranging from about 2% wt-% to about 3 wt-% of the weight of the palm stearin.

11. A method of making a nut butter comprising, comprising the step of mixing a highly saturated non-hydrogenated palm stearin and a recrystallization agent into the nut butter.

* * * * *